United States Patent
Weese et al.

(10) Patent No.: US 7,742,631 B2
(45) Date of Patent: Jun. 22, 2010

(54) ADAPTIVE SAMPLING ALONG EDGES FOR SURFACE RENDERING

(75) Inventors: Jurgen Weese, Aachen (DE); Marc Busch, Aachen (DE); Gundolf Kiefer, Aachen (DE); Helko Lehmann, Aachen (DE)

(73) Assignee: Koninklijke Philips Electronics N.V., eindhoven (NL)

( * ) Notice: Subject to any disclaimer, the term of this patent is extended or adjusted under 35 U.S.C. 154(b) by 953 days.

(21) Appl. No.: 10/598,635

(22) PCT Filed: Mar. 3, 2005

(86) PCT No.: PCT/IB2005/050791

§ 371 (c)(1),
(2), (4) Date: Sep. 7, 2006

(87) PCT Pub. No.: WO2005/091227

PCT Pub. Date: Sep. 29, 2005

(65) Prior Publication Data

US 2007/0177005 A1    Aug. 2, 2007

(30) Foreign Application Priority Data

Mar. 12, 2004   (EP) .................... 04101030

(51) Int. Cl.
*G06K 9/00* (2006.01)

(52) U.S. Cl. .................. 382/131; 382/154

(58) Field of Classification Search ................. 382/131, 382/154, 266, 269, 299; 345/419, 423, 424, 345/611, 613
See application file for complete search history.

(56) References Cited

U.S. PATENT DOCUMENTS

| | | | |
|---|---|---|---|
| 6,018,600 A | * | 1/2000 | Levin et al. .................. 382/284 |
| 6,943,805 B2 | * | 9/2005 | Snyder et al. ................ 345/589 |
| 2003/0081821 A1 | * | 5/2003 | Mertelmeier et al. ........ 382/131 |

FOREIGN PATENT DOCUMENTS

EP   1 074 938 A2  *  2/2001

OTHER PUBLICATIONS

Lin et al., "An Anti-Aliasing Method for Parallel Rendering," IEEE Proc. Computer Graphics Int'l '98, Jun. 22-26, 1998, pp. 228-235.*
Lau, "An Adaptive Supersampling Method," Image Analysis Applications and Computer Graphics, Proc. 3$^{rd}$ Int'l Computer Science Conf. ICSC '95, LNCS vol. 1024, Dec. 11-13, 1995, pp. 205-214.*

* cited by examiner

*Primary Examiner*—Andrew W Johns (57) ABSTRACT

High frequency signals cannot be reconstructed properly from sampled data if the sampling frequency lies below the Nyquist rate. The invention addresses this problem by choosing few additional sample points along a trajectory intersecting the region comprising the high frequency signals, such as an edge. Intermediate rendering data is used to determine the additional sample points. Therefore, according to an exemplary embodiment of the present invention, 4 adaptively chosen sample points per pixel may provide a visual quality comparable to 16 times super-sampling, but at a much lower computational cost.

13 Claims, 6 Drawing Sheets

ADAPTIVE SAMPLING ALONG EDGES FOR SURFACE RENDERING

The present invention relates to the field of digital imaging. In particular, the present invention relates to a method of adaptive sampling of a structure in a data set, to an image processing device, to a scanner system and to a computer program product for performing an adaptive sampling of a structure in a data set.

Endoscopy is an important technique in medical diagnosis. It is often only possible to determine the origin of a symptom or a sign of an early phase of disease by visually examining the inside of the living human body. Every year thousands of endoscopic procedures are carried out. Optical endoscopy is a medical procedure used to examine hollow organs or cavities inside a human body. This is often a painful operation in which the endoscope is inserted into the patient through a natural hole or else through a small incision. Endoscopy techniques vary with respect to which organ is to be examined. One of the most prominent endoscopy techniques is colonoscopy.

A further example of endoscopy is bronchioscopy which makes possible an examination of the lungs of a patient. Both colonoscopy and bronchioscopy may entail risk and discomfort for the patient.

Virtual endoscopy is a relatively new method of diagnosis which makes use of the computer processing of three-dimensional image data sets. The data sets provide simulated visualizations of patient organs similar or equivalent to images produced by standard endoscopic procedures. The data sets are created using tomography, such as computed tomography (CT) or magnetic-resonance imaging (MRI). The data acquisition is therefore non-invasive which means that it causes only minimal discomfort for the patient.

Conventional CT and MRI scans provide cross-sectional or slice images of the body. Each data slice is a map of discrete and equidistantly distributed density values, so-called voxels. The discretization may introduce sampling and reconstruction errors. Therefore, a cross-section resulting from tomography is never a perfect representation of a slice of the human body.

Sophisticated algorithms and high-performance computing may be used to provide stacks of such cross-sections as direct three-dimensional representations of the human anatomy. Virtual endoscopic visualization avoids the risk associated with real endoscopy and, when used prior to performing an actual endoscopic examination, can minimize procedural difficulties. Furthermore, virtual endoscopy allows for the examination of body regions which are not accessible for real endoscopy, such as plat vessels.

Iso-surface rendering is used in numerous clinical applications for the visualization of three-dimensional medical data. An iso-surface is the set of all points within a data volume, which are assigned the same density value. This data value is called the threshold or iso-value and must be specified by the operator prior to the examination process. It marks the boundary between regions of higher density, which may be called the interior of the iso-surface, and regions of lower density, which may be called the exterior. Points in the volume that can be mapped exactly to a voxel of the data set are assigned the value of the voxel. Density values of other points are calculated using interpolation between the density values of the surrounding voxels. Points with density values that are greater than the threshold are mapped to the interior by the iso-surfacing algorithm, all other points are mapped to the exterior.

One example of iso-surface rendering during the above-mentioned virtual endoscopy is performed during virtual colonoscopy. In virtual colonoscopy, pseudo-realistic views of the colon are rendered from CT data. The generation of movies through the colon along a pre-computed path is a common application in virtual colonoscopy. Path generation is performed semi or fully automatically, so that the clinician can focus on spotting polyps during the fly-through. If such anatomic abnormality is found, it might be beneficial to leave the pre-generated path and to inspect the polyp from arbitrary view points. Therefore, interactive rendering facilitates and may finally substitute the generation of non-interactive movies in virtual colonoscopy.

A prerequisite and major criterion for surface rendering applications in general is a high level of picture quality as visible artifacts may distract the clinician or even lead to misinterpretations.

Another important requirement is speed. In order to challenge traditional endoscopy, a virtual endoscopy system should have the capacity to allow for interactive navigation within the investigated human organ.

Unfortunately, the design of a virtual endoscopy program or method usually includes a trade-off between these two key requirements, since it is hard to provide for high update and rendering speed on the one hand and for high image quality on the other hand.

One draw-back resulting from a high rendering speed is aliasing. Aliasing causes staircase artifacts along edges and rendered images. This leads to a degradation of image quality, which gets even worse, when views are rendered at high frame rates or when movies are generated, as is the case for example in many virtual endoscopy applications. An edge passing through an image pixel produces flickering since the pixel values switches instantly between different grey values when the edge oversteps the pixel center. This typical aliasing effect is visually annoying and should be eliminated to reach the target of excellent picture quality.

Super-sampling is one way to get rid of aliasing artifacts. Here, instead of using only one sample point per pixel, 16 or more samples are evaluated and the average value is assigned to the pixel. This results in smooth edges and also the flickering in movies disappears since pixel values change gradually between grey levels and edges are passed through. However, this approach is computationally expensive and contradicts the aim of high rendering performance. The slow-down and rendering speed is unacceptable even though only few pixels in the image need to be super-sampled.

It is an object of the present invention to provide for an adaptive sampling and therefore for an increased rendering performance.

According to an exemplary embodiment of the present invention as set forth in claim 1, the above object may be solved by a method of adaptive sampling of a structure in a data set, wherein the method comprises the steps of identifying a region of the structure comprising high frequency signals and performing a first sampling with a first sampling rate, resulting in a sampled structure comprising first sample points. The first sampling is thereby performed along a trajectory intersecting the region comprising the high frequency signals.

Advantageously, according to this exemplary embodiment of the present invention, a few additional sample points are chosen along a trajectory intersecting the region comprising the high frequency signals. The trajectory may be oriented in a direction perpendicular to the region comprising the high frequency signals. By choosing the first sampling rate high enough, the high frequency signals may be reconstructed properly from the sampled data, since the sampling frequency lies above the Nyquist rate. Advantageously, by performing the first sampling along the trajectory, which is one-dimensional, and not along two directions defining an area, the number of sample points per pixel may be reduced compared to super-sampling, resulting in an increased sampling speed.

According to another exemplary embodiment of the present invention as set forth in claim 2, the region of the structure comprising high frequency signals is identified by performing a second sampling with a second sampling rate, wherein the first sampling rate is higher than the second sampling rate.

Therefore, not the whole structure has to be sampled with the higher first sampling rate, but only the region of the structure which comprises the high frequency signals. After sampling the structure with the lower second sampling rate and after identifying the region of high frequency signals, this region of high frequency signals may be sampled with the first (higher) sampling rate, resulting in a reduction of aliasing artifacts in that particular region while still providing for a fast sampling speed compared to common super-sampling.

According to another exemplary embodiment of the present invention as set forth in claim 3, the sampled structure is rendered on the basis of the first sampling, wherein an average pixel value of a pixel in the region comprising the high frequency signals is determined by evaluating an average of the values of the first sample points.

Advantageously, according to this exemplary embodiment of the present invention, the values of the first sample points which are located along the trajectory intersecting the region comprising the higher frequency signals are averaged and this average value is then assigned to a specific pixel in the region. This may provide for a reduction of aliasing artifacts in the region of high frequency signals.

According to another exemplary embodiment of the present invention as set forth in claim 4, the structure is determined by an iso-surface rendering procedure.

Advantageously, the iso-surface rendering procedure may provide for a fast identification of the structure, such as, for example, an inner organ. Advantageously, the iso-surface rendering procedure may even provide for an interactive threshold adjustment.

According to another exemplary embodiment of the present invention as set forth in claim 5, the trajectory along which the first sampling is performed is a line intersecting the region comprising the high frequency signals.

Advantageously, by performing the first sampling along a line, the sampling speed may be further increased.

According to another exemplary embodiment of the present invention as set forth in claim 6, the region of the structure comprising the high frequency signals is an edge. Advantageously, according to this exemplary embodiment of the present invention, aliasing artifacts arising along edges may adaptively be reduced or compensated for.

According to another exemplary embodiment of the present invention as set forth in claim 7, the adaptive sampling includes a ray casting and the ray casting is used for detecting the edge. According to this exemplary embodiment of the present invention, a ray casting is used to generate, for example, an image of the structure with reduced resolution. Then, according to an aspect of the present invention, areas of the image for the structure comprising high frequency signals are identified and the sampling frequency is increased along a trajectory intersecting that region.

According to another exemplary embodiment of the present invention as set forth in claim 8, the structure comprises a surface which comprises a surface variation. Furthermore, the trajectory extends along a direction of a maximum surface variation.

Advantageously, according to this exemplary embodiment of the present invention, the first sampling (with the higher frequency) is performed along the direction in which the change of surface orientation is maximal, which may be, for example, an edge. Therefore, according to this exemplary embodiment of the present invention, additional sample points are provided in a direction in which the change of the surface orientation is maximal and therefore the change of the values of the sample points is maximal.

According to another exemplary embodiment of the present invention as set forth in claim 9, the method is used for virtual endoscopy. This may provide for an adaptive sampling in medical applications such as virtual colonoscopy and therefore for an improved rendering performance.

Advantageously, according to another exemplary embodiment of the present invention as set forth in claim 10, an image processing device for adaptive sampling of a structure in a data set is provided, comprising a memory for storing the data set and an image processor adapted for performing the following operation: loading the data set, identifying a region of the structure comprising high frequency signals and performing a first sampling with a first sampling rate, resulting in a sampled structure comprising first sample points. The first sampling is performed along a trajectory intersecting the region comprising the high frequency signals.

Advantageously, this may allow for an adaptive sampling.

The present invention also relates to scanner systems comprising a memory for storing a data set and an image processor adapted for performing adaptive sampling of a structure in the data set. According to an aspect of the present invention, the scanner system is one of a CT scanner system and a MR scanner system. The scanner systems according to the present invention are set forth in claims 11 and 12.

Advantageously, this may allow for an adaptive sampling and for an improved rendering performance of a structure in a data set acquired by a CT scanner system or a MR scanner system.

The present invention also relates to a computer program product, which may, for example, be executed on a processor, such as an image processor. Such computer programs may be part of, for example, a CT scanner system or a MR scanner system. The computer programs, according to another exemplary embodiment of the present invention, are set forth in claim 13. These computer programs may be preferably loaded into working memories of image processors. The image processors are thus equipped to carry out exemplary embodiments of the methods of the present invention. The computer programs may be stored on a computer readable medium, such as a CD-ROM. The computer programs may also be presented over a network, such as the WorldWideWeb and may be downloaded into the working memory of an image processor from such networks. The computer program according to this exemplary embodiment of the present invention may be written in any suitable programming language, such as C++.

It may be seen as the gist of an exemplary embodiment of the present invention that a structure in a data set is adaptively sampled, wherein a sampling with a higher sampling rate is performed along a trajectory which intersects a region comprising high frequency signals. Therefore, according to an exemplary embodiment of the present invention, most of the structure may be sampled with a lower sampling rate and only regions of high frequency signals, which may otherwise lead to aliasing artifacts, are partly sampled with a higher sampling rate. Advantageously, according to an exemplary embodiment of the present invention, the sampling with the higher sampling rate is performed along a line perpendicular to the region of high frequency signals, which may result in a visual quality of the rendered image which is comparable to super-sampling with much more samples per pixel. This may lead to a reduction of computational cost while still providing for sufficient image quality.

These and other aspects of the present invention will become apparent from and elucidated with reference to the embodiments described hereinafter.

Exemplary embodiments of the present invention will be described in the following, with reference to the following drawings.

Figure 1:
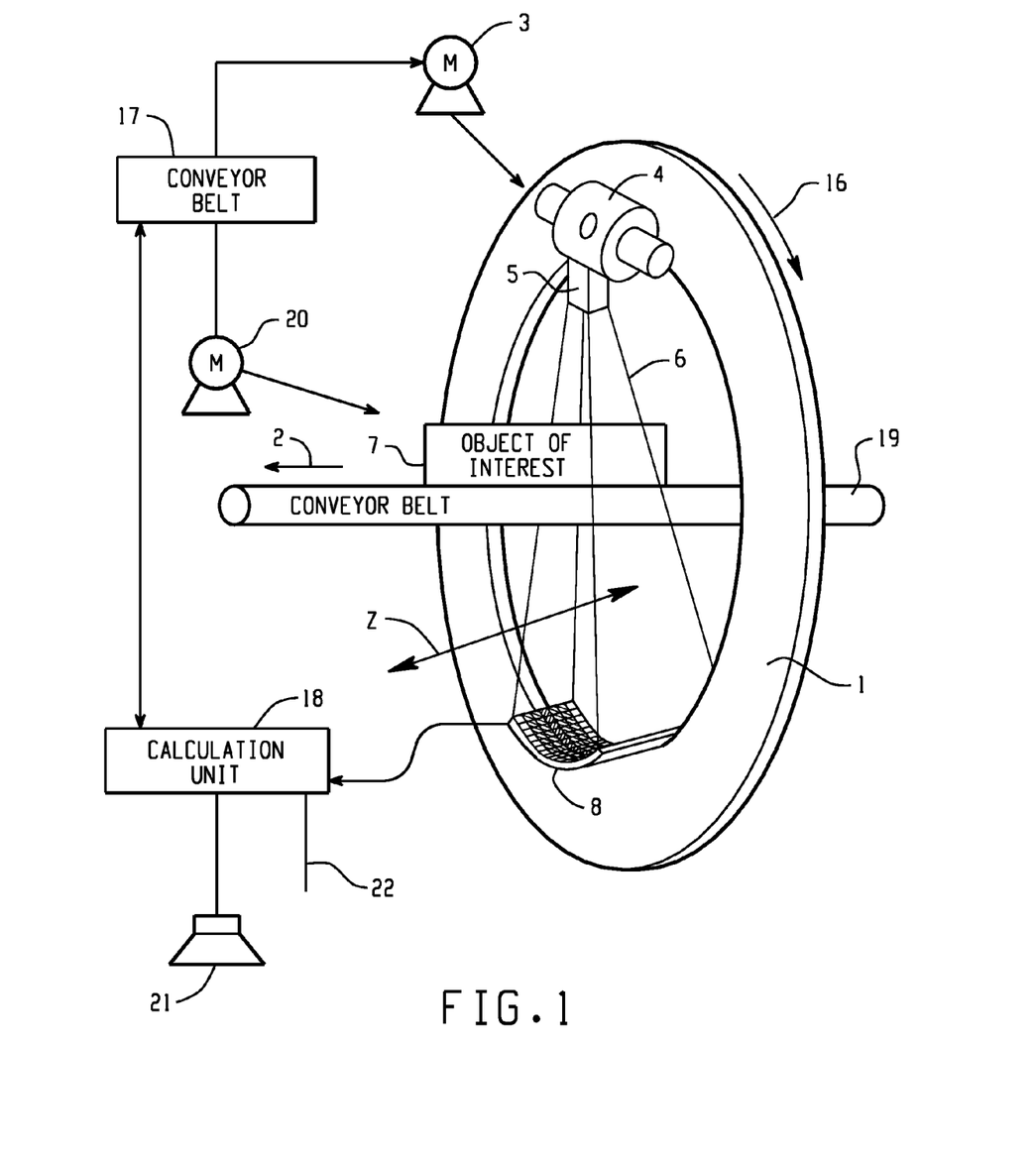
FIG. 1 shows a simplified schematic representation of an embodiment of a computed tomography (CT) scanner according to the present invention.

FIG. 1 shows an exemplary embodiment of the present invention of a CT (computed tomography) scanner system according to the present invention. With reference to this exemplary embodiment, the present invention will be described for the application in medical imaging. However, it should be noted that the present invention is not limited to the application in the field of medical imaging, but may be used in applications such as baggage inspection to detect hazardous materials, such as explosives, in items of baggage or other industrial applications, such as material testing.

The scanner depicted in FIG. 1 is a cone-beam CT scanner. The CT scanner depicted in FIG. 1 comprises a gantry 1, which is rotatable around a rotational axis 2. The gantry is driven by means of a motor 3. Reference numeral 4 designates a source of radiation such as an x-ray source, which, according to an aspect of the present invention, emits a polychromatic radiation beam.

Reference numeral 5 designates an aperture system which forms a radiation beam emitted from the radiation source to a cone-shaped radiation beam 6.

The cone-beam 6 is directed such that it penetrates an object of interest 7 arranged in the centre of the gantry 1, i.e. in an examination region of the CT scanner, and impinges onto the detector 8. As may be taken from FIG. 1, the detector 8 is arranged on the gantry 1 opposite the source of radiation 4, such that the surface of the detector 8 is covered by the cone-beam 6. The detector 8 depicted in FIG. 1 comprises a plurality of detector elements.

During a scan of the object of interest 7, the source of radiation 4, the aperture system 5 and detector 8 are rotated along the gantry 1 in the direction indicated by arrow 16. For rotation of the gantry 1 with the source of radiation 4, the aperture system 5 and the detector 8, the motor 3 is connected to a motor control unit 17, which is connected to a calculation unit 18.

In FIG. 1, the object of interest is disposed on a conveyor belt 17. During the scan of the object of interest 7, while the gantry 1 rotates around the patient 7, the conveyor belt 19 displaces the object of interest 7 along a direction parallel to the rotational axis 2 of the gantry 1. By this, the object of interest 7 is scanned along a helical scan path. The conveyor belt 19 may also be stopped during the scans. Instead of providing a conveyor belt 19, for example, in medical applications, where the object of interest 7 is a patient, a movable table is used. However, it should be noted that in all of the described cases it is also possible to perform a circular scan, where there is no displacement in a direction parallel to the rotational axis 2, but only the rotation of the gantry 1 around the rotational axis 2.

The detector 8 is connected to the calculation unit 18. The calculation unit 18 receives the detection result, i.e. the read-outs from the detector element of the detector 8, and determines a scanning result on the basis of the read-outs. The detector elements of the detector 8 may be adapted to measure the attenuation caused to the cone-beam 6 by the object of interest. Furthermore, the calculation unit 18 communicates with the motor control unit 17 in order to coordinate the movement of the gantry 1 with motor 3 and 20 or with the conveyor belt 19.

The calculation unit 18 may be adapted for reconstructing an image from read-outs of the detector 8. The image generated by the calculation unit 18 may be output to a display (not shown in FIG. 1) via an interface 22.

The calculation unit which may be realized by an image processor integrated into an image processing device comprising a memory for storing a data set may also be adapted to perform an adaptive sampling of a structure in the data set. The data processor or image processor according to an aspect of the present invention may be adapted for loading the data set and for identifying a region of the structure comprising high frequency signals. Furthermore, the data processor may be adapted for performing a first sampling with a first sampling rate, resulting in a sampled structure comprising first sample points, wherein the first sampling is performed along a trajectory intersecting the region comprising the high frequency signals.

Furthermore, as may be taken from FIG. 1, the calculation unit 18 may be connected to a loudspeaker 21 to, for example, automatically output an alarm.

Figure 2:
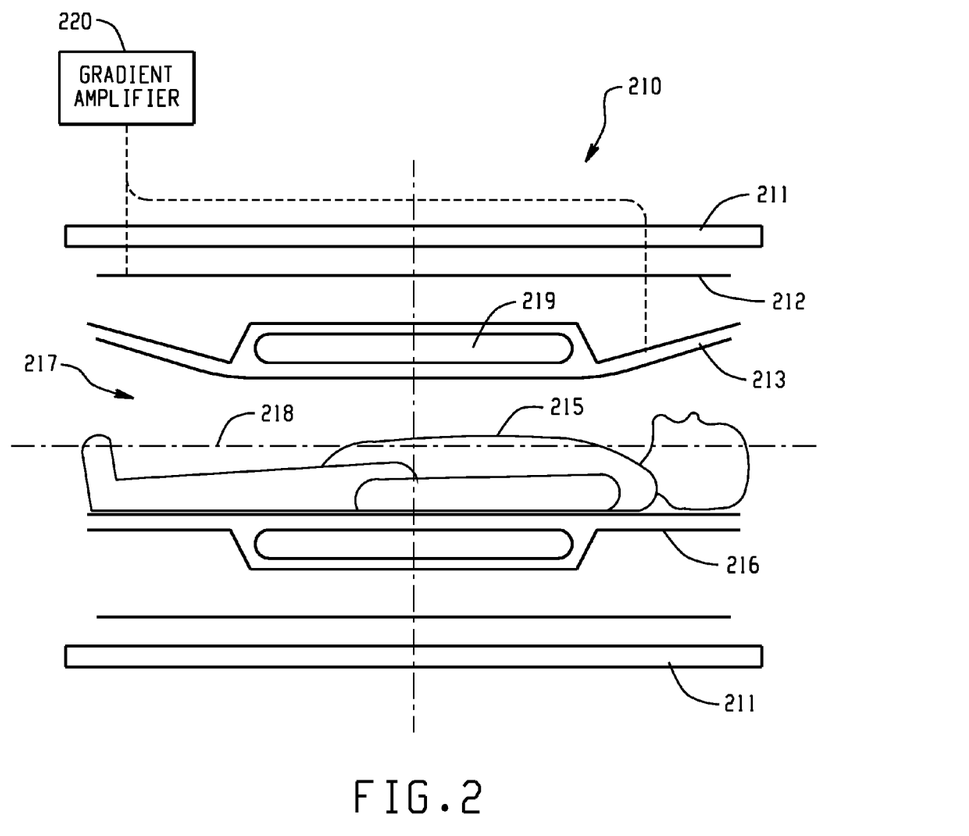
FIG. 2 shows a simplified schematic representation of an embodiment of a magneto-resonance (MR) scanner according to the present invention.

FIG. 2 shows a simplified schematic representation of an embodiment of a MR scanner system according to the present invention. The MR scanner system comprises coils 210 which are arranged along an axis 218 and surround an examination space 217, in which a patient 215 which has to be examined is positioned. Advantageously, the patient lies on a movable table or conveyor belt 216, which is disposed at the lower part of the examination space 217. The system of coils 210 surrounding the examination space 217 comprises an HF-Coil 219, an actively shielded arrangement of gradient coils comprising an inner coil 213 and an actively shielded coil or shield 212 and a cryostat 211, in which the coils are arranged in order to be cooled down during generation of the magnetic field. The arrangement of gradient coils 213, 212 may be connected to a gradient amplifier 220.

Furthermore, the MR scanner system may comprise, according to the CT scanner system depicted in FIG. 1, a motor control unit with respective motors, for example for moving the conveyor belt 216, and a calculation unit (not shown in FIG. 2). Such a MR scanner system is described in DE 102 02 986 A1, which is hereby incorporated by reference.

Figure 3:
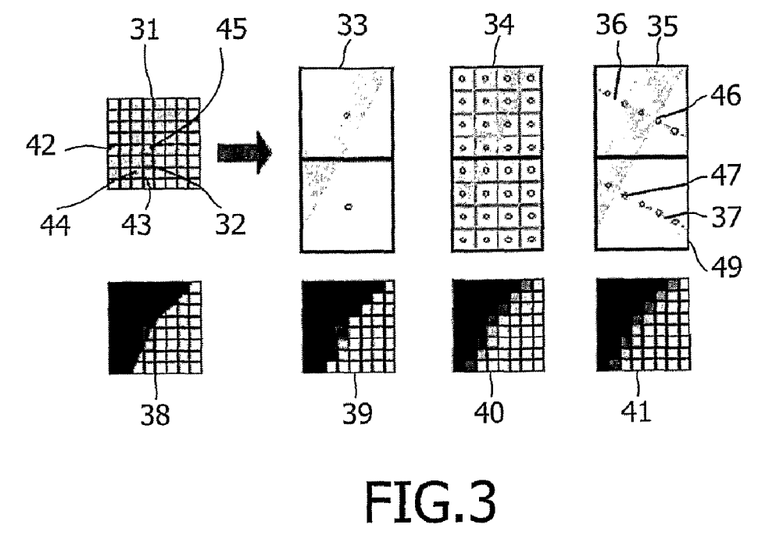
FIG. 3 shows a schematic representation of an original image and of images rendered with normal sampling, with anti-aliasing comprising super-sampling and with adaptive anti-aliasing comprising super-sampling according to an exemplary embodiment of the present invention.

FIG. 3 shows a schematic representation of an original image 31, 38, which comprises a region 44 of a structure, which comprises high frequency signals. The region 44 comprising high frequency signals may be an edge between an area 42 of the structure which is located on a higher level and an area 43 of the structure which is located on a lower level. Reference numerals 32, 45 represent two pixels which are located on the edge or step 44.

As may be seen from rendered image 39, aliasing causes staircase artifacts along the edge 44 in the rendered image 39, since the sampling frequency in a sampled image 33 is not high enough. This leads to a degradation of image quality, which gets even worse, when views are rendered at high frame rates or when movies are generated, as is the case, for example, in many virtual endoscopy applications. An edge passing through an image pixel produces flickering since the pixel value switches instantly between different grey values when the edge oversteps the pixel center. This typical aliasing effect is visually annoying and should be eliminated to reach the target of excellent picture quality.

Super-sampling is one way to get rid of aliasing artifacts, as may be seen from the sampled picture 34 and the corresponding rendered picture 40. Here, instead of using only one sample point per pixel, 16 or more samples are evaluated and the average value is assigned to the pixel. This results in smooth edges and also the flickering in movies disappears since pixel values change gradually between grey levels when edges are passed through. However, this approach is computational expensive and contradicts the aim of high rendering performance. The slow down in rendering speed is unacceptable even though only few pixels in the image need to be super-sampled.

Therefore, according to an exemplary embodiment of the present invention, a region of the structure comprising high frequency signals (i.e. the edge 44 in FIG. 3) is identified by performing a pre-sampling or second sampling with a pre-sampling rate or second sampling rate. This pre-sampling rate is a relatively low sampling rate, resulting in a fast sampling but still with a sufficiently high sampling rate for regions of the structure which do not comprise high frequency signals. After identification of a region comprising high frequency signals, a post-sampling or a first sampling is performed with a post-sampling rate or first sampling rate along a trajectory 36 intersecting the region comprising the high frequency signals. Furthermore, a further post-sampling along another trajectory 37 intersecting the region comprising the high frequency signals is performed. This post-sampling results in a sampled structure comprising first sample points 46, 47.

According to an exemplary embodiment of the present invention, the trajectory may be a line intersecting the region comprising the high frequency signals (as depicted in FIG. 3). But it should be noted, that the trajectory may have any other shape, such as, for example, a convex shape or a concave shape. For example, the trajectory may be aligned along point in the direction of maximum surface variation.

In other words, according to an aspect of the present invention, sample points along the direction of maximum surface normal variation are chosen. Therefore, fewer additional samples as compared to other super-sampling or anti-aliasing techniques are needed to render images of comparable quality. Hereby, anti-aliasing becomes computationally feasible, even for applications with high demands concerning rendering performance.

The additional sample points 46, 47 are chosen adaptively, depending on the edge orientation, as may be seen from the sampled image 35 in FIG. 3. Since changes of the surface normal appear mainly in the direction perpendicular to the edge while the surface normal does not change significantly in parallel directions, few additional samples along the perpendicular direction are evaluated and an average, for example a weighted average, is used as pixel value. The perpendicular direction may be determined by projecting the surface normal of the pixel with the lower depth value (pixel 49) onto the image plane. Few additional sample points along this direction are sufficient to render images of excellent picture quality, as may be seen from rendered image 41.

It should be noted, that the structure may be determined by an iso-surface rendering procedure, which may even allow for interactive threshold adjustment, therefore providing for an interactive threshold determination with the possibility of finding a suitable threshold value on the fly as well as checking for interesting features within a range of thresholds.

Figure 4:
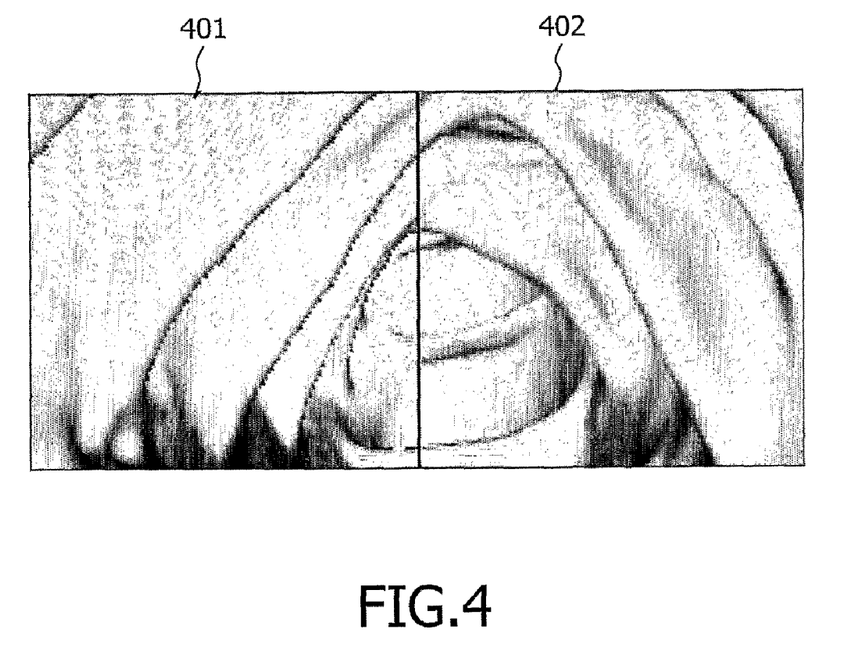
FIG. 4 shows an image of a virtual colonoscopy rendered with (right) and without (left) adaptive anti-aliasing comprising super-sampling according to an exemplary embodiment of the present invention.

FIG. 4 shows an image of a virtual colonoscopy rendered with 401 and without 402 adaptive anti-aliasing with super-sampling according to an exemplary embodiment of the present invention. The high frequency signals of the image rendered without adaptive anti-aliasing 401 cannot be reconstructed properly from sampled data if the Nyquist-Shannon Sampling Theorem is not fulfilled, i.e. if the sampling frequency lies below the Nyquist rate. One evident manifestation of this aliasing in iso-surface rendered images are staircase artifacts or "jaggies" along edges, due to the infinite frequency spectrum of these image features. The deficiency of the visual impression becomes most obvious in motion pictures or images that are rendered at a high frame rate, where aliasing artifacts lead to flickering edges that introduce a distracting element of nervousness. One example of a clinical application that generates movies is virtual colonoscopy. The annoying flickering makes it difficult for the viewer to focus on the actual task of spotting polyps, and any measure that improves this situation will be a welcomed feature in clinical practice.

In image 401 the aliasing artifacts can be observed along the edges. Casting additional rays per pixel can drastically reduce aliasing artifacts. However, the additional computational cost involved with conventional super-sampling contradicts the aim of high rendering performance. The invention addresses this problem by choosing few additional sample points in, for example, a direction perpendicular to the edge. Intermediate rendering data resulting from a pre-sampling or second sampling with a pre-sampling rate or second sampling rate, is used to determine the additional sample points. Experiments show that 4 adaptively chosen sample points per pixel offer a visual quality comparable to 16 times super-sampling, but at a much lower computational cost, as may be seen from image 402 in FIG. 4.

Figure 5:
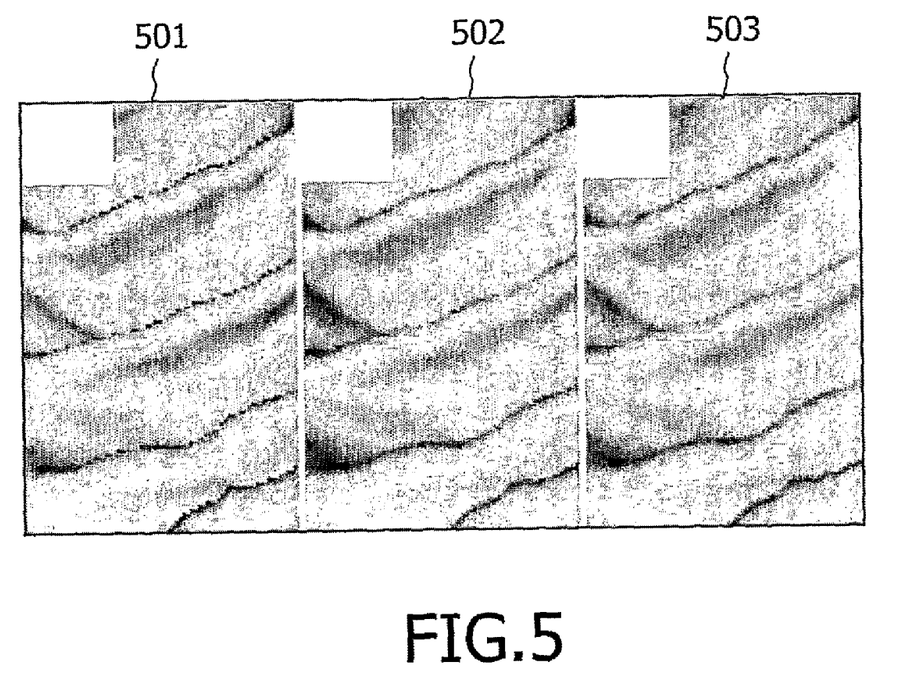
FIG. 5 shows an image rendered with normal sampling showing staircase artifacts (left), an image rendered with anti-aliasing with super-sampling (middle) and an image rendered with adaptive anti-aliasing with super-sampling according to an exemplary embodiment of the present invention (right).

FIG. 5 shows image 501 rendered with a normal low sampling rate showing staircase artifacts, wherein images 502, 503 show the benefit of anti-aliasing. Edges appear smooth and do not flicker when pictures are generated at high frame rates. Adaptive anti-aliasing introduces the quality of 16 times super-sampled images to iso-surface rendering, but at a much lower computational cost. This may be seen from image 502, which shows a super-sampled image using 16 samples per pixel and, in comparison, from image 503, which uses adaptive anti-aliasing with only 4 additional samples per pixel, according to an exemplary embodiment of the present invention.

Figure 6:
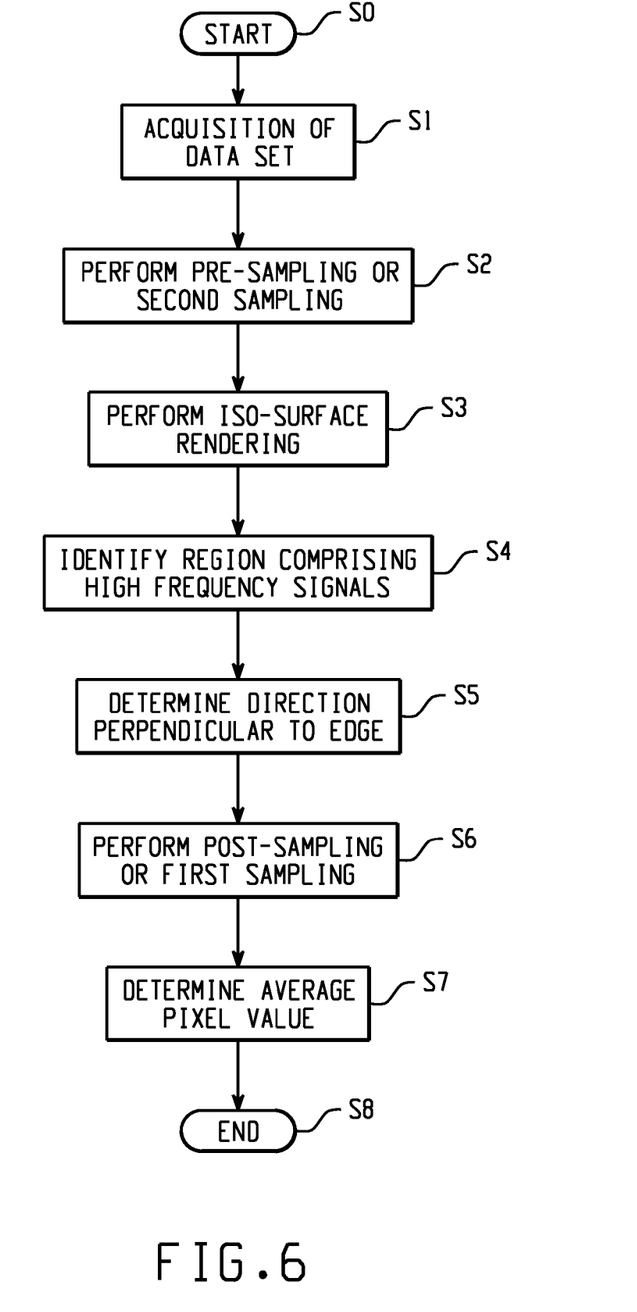
FIG. 6 shows a flow-chart of an exemplary embodiment of a method of adaptive sampling of a structure in a data set according to the present invention.

FIG. 6 shows a flow-chart of an exemplary embodiment of a method of adaptive sampling of a structure in a data set according to the present invention. The method starts at step S0, after which an acquisition of a data set is performed in step S1, for example by means of a polychromatic source of electromagnetic radiation generating a polychromatic beam and by means of a radiation detector detecting the polychromatic beam, which is the case in, for example, CT virtual colonoscopy or, for example, magneto-resonance virtual endoscopy.

After that, in step S2, a pre-sampling or second sampling is performed. This pre-sampling may be performed at a lower sampling rate, which is high enough to provide for high image quality in regions of lower frequencies, but which may not be high enough for providing excellent image quality in regions which comprise high frequency signals, such as edges. After the pre-sampling an iso-surface rendering is performed in step S3 for determining a structure in the data set by ray casting. Ray casting may be performed for each pixel in the image plane in order to calculate the distance from the view point to the corresponding surface point and the angle between the viewing vector and the surface normal at that point. The intermediate data can now be used to determine those areas of the image where under-sampling would cause a significant loss of image quality, such as areas with high variation of the surface orientation or edges, for example, at wrinkles of the surface.

After determination of the structure in step S3, a region in the structure comprising high frequency signals, i.e. the areas of high surface orientation or edges, is identified in step S4. Then, in step S5, a direction perpendicular to the edge is determined, for example, by projecting the surface normal of the pixel with the lower depth value (see FIG. 3, reference numeral 49) onto the image plane. Few additional sample points along this direction are sufficient to render images of excellent picture quality.

Then, in step S6, a post-sampling or first sampling is performed with a first sampling rate, which is a high sampling rate, along a line intersecting the edge along the direction perpendicular to the edge. In step S7, an average pixel value is determined by evaluating a weighted average of the values of the sample points along the line. This may result in a well-determined pixel value and consequently in an excellent picture quality (even at edges) of the whole picture at low computational cost. The method ends at step S8.

It should be noted that adaptive anti-aliasing may also be used to eliminate aliasing artifacts along boundaries of neighboring polygons when mesh models are rendered, as is the case in most hardware accelerated surface rendering procedures, for example, in all variants of "marching cube" algorithms or in present three-dimensional computer games. Furthermore, the approach of adaptive anti-aliasing may be extended to direct volume rendering whenever a shading model is used at steep parts of the transfer function to visualize shiny transparent surfaces.

Two-dimensional image processing is another field of application where fast anti-aliasing may proof beneficial.

Figure 7:
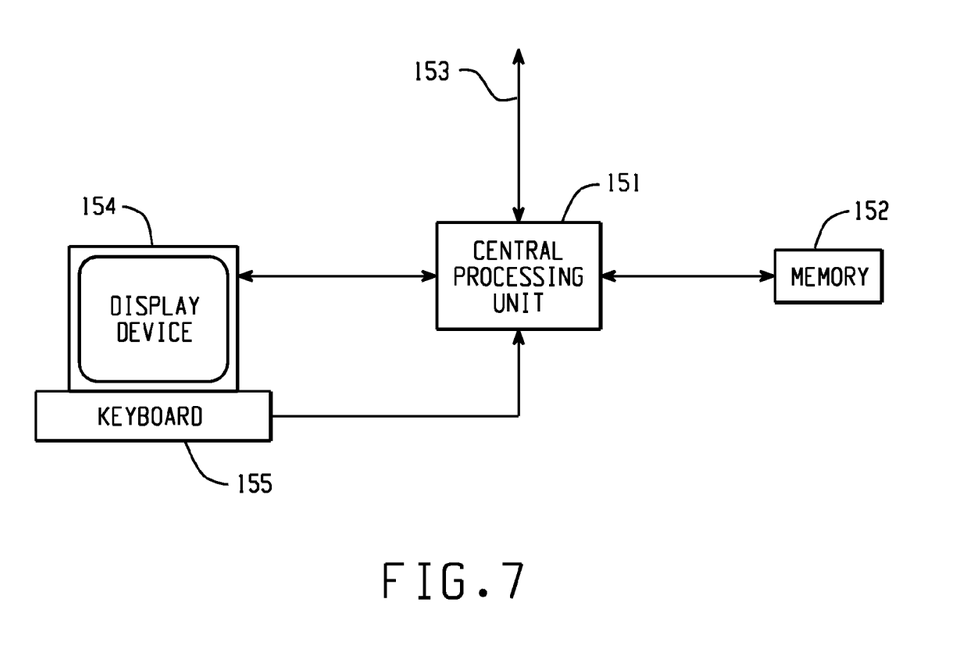
FIG. 7 shows an exemplary embodiment of the present invention of an image processing device according to the present invention, for executing an exemplary embodiment of a method in accordance with the present invention.

FIG. 7 depicts an exemplary embodiment of an image processing device according to the present invention, for executing an exemplary embodiment of a method in accordance with the present invention. The image processing device depicted in FIG. 7 comprises a central processing unit (CPU) or image processor 151 connected to a memory 152 for storing an image depicting an object of interest, such as a patient. The image processor 151 may be connected to a plurality of input/output network or diagnosis devices, such as a MR device or a CT device. The image processor is furthermore connected to a display device 154, for example a computer monitor, for displaying information or an image computed or adapted in the image processor 151. An operator may interact with the image processor 151 via a keyboard 155 and/or other output devices, which are not depicted in FIG. 7.

Furthermore, via the bus system 153 it is also possible to connect the image processing and control processor 151 to, for example, a motion monitor which monitors a motion of the object of interest. In case, for example, a lung of a patient is imaged, the motion sensor may be an exhalation sensor. In case the heart is imaged, the motion sensor may be an electrocardiogram (ECG).

The invention claimed is:

1. A method of adaptive sampling of a structure in a data set, the method comprising the steps of: identifying a region of the structure comprising high frequency signals; performing a first sampling with a first sampling rate, resulting in a sampled structure comprising first sample points; wherein the first sampling is performed along a trajectory intersecting the region comprising the high frequency signals, wherein the region of the structure comprising high frequency.

2. The method according to claim 1, wherein the region of the structure comprising high frequency signals is identified by performing a second sampling with a second sampling rate; wherein the first sample rate is higher than the second sampling rate.

3. The method according to claim 1, wherein the sampled structure is rendered on the basis of the first sampling; and wherein an average pixel value of a pixel in the region comprising the high frequency signals is determined by evaluating an average of the values of the first sample points.

4. The method according to claim 1, wherein the structure is determined by an iso-surface rendering procedure.

5. The method according to claim 1, wherein the trajectory along which the first sampling is performed is a line intersecting the region comprising the high frequency signals.

6. The method according to claim 1, wherein the region of the structure comprising the high frequency signals is an edge.

7. The method according to claim 1, wherein the adaptive sampling includes a ray casting; and wherein the ray casting is used for detecting the edge.

8. The method according to claim 1, wherein the structure comprises a surface; wherein the surface comprises a surface variation; and wherein the trajectory extends along a direction of a maximum surface variation.

9. The method according to claim 1, wherein the method is used for virtual endoscopy.

10. An image processing device for adaptive sampling of a structure in a data set, the image processing device comprising: a memory for storing the data set; an image processor adapted for performing the following operation: loading the data set; identifying a region of the structure comprising high frequency signals; performing a first sampling with a first sampling rate, resulting in a sampled structure comprising first sample points; wherein the first sampling is performed along a trajectory intersecting the region comprising the high frequency signals.

11. A scanner system, comprising: a memory for storing a data set; an image processor adapted for performing adaptive sampling of a structure in the data set, wherein the image processor is adapted for performing the following operation: loading the data set; identifying a region of the structure comprising high frequency signals; performing a first sampling with a first sampling rate, resulting in a sampled structure comprising first sample points; wherein the first sampling is performed along a trajectory intersecting the region comprising the high frequency signals.

12. A scanner system according to claim 11, wherein the scanner system is one of a CT scanner system and a MR scanner system.

13. A computer program stored on a non-transitory computer readable medium, wherein the computer program is for performing adaptive sampling of a structure in a data set, wherein an image processor performs the following operation when the computer program is executed on the image processor: loading the data set; identifying a region of the structure comprising high frequency signals; performing a first sampling with a first sampling rate, resulting in a sampled structure comprising first sample points; wherein the first sampling is performed along a trajectory intersecting the region comprising the high frequency signals.

* * * * *